United States Patent [19]
Vuong

[11] Patent Number: 6,104,302
[45] Date of Patent: Aug. 15, 2000

[54] FUSE PROTECTED POWER SUPPLY CIRCUIT FOR A SENSOR-OPERATED SOLENOID

[75] Inventor: Nhon T. Vuong, Lombard, Ill.

[73] Assignee: Sloan Valve Company, Franklin Park, Ill.

[21] Appl. No.: 09/372,837

[22] Filed: Aug. 12, 1999

[51] Int. Cl.[7] .................................................. G08B 21/00
[52] U.S. Cl. ........................... 340/635; 340/650; 340/638
[58] Field of Search ................................... 340/635, 638, 340/639, 642, 644, 650

[56] References Cited

U.S. PATENT DOCUMENTS 6,020,811  2/2000  Saito et al. ............................... 340/438

Primary Examiner—Julie Lieu
Attorney, Agent, or Firm—McEachran, Jambor, Keating, Bock & Kurtz

[57] ABSTRACT

A fuse protected power supply circuit for a sensor-operated solenoid controls plumbing fixtures such as automatically-operated faucets, automatically-operated flush valves, hand dryers, soap dispensers and the like. The circuit includes two automatically resettable fuses, one to protect the power supply circuit if the AC-operated solenoid should short and a second to protect the power supply circuit in the event that the sensor which detects the presence of a user of the plumbing device should short. The automatically resettable fuses provide a simple and reliable troubleshooting method in that replacement of either the sensor or the solenoid, depending upon whether one or both are in a shorted condition, allows the circuit to return to normal operation. Such troubleshooting may be undertaken by a maintenance person without the need of sophisticated electronic meters or similar troubleshooting devices.

4 Claims, 1 Drawing Sheet

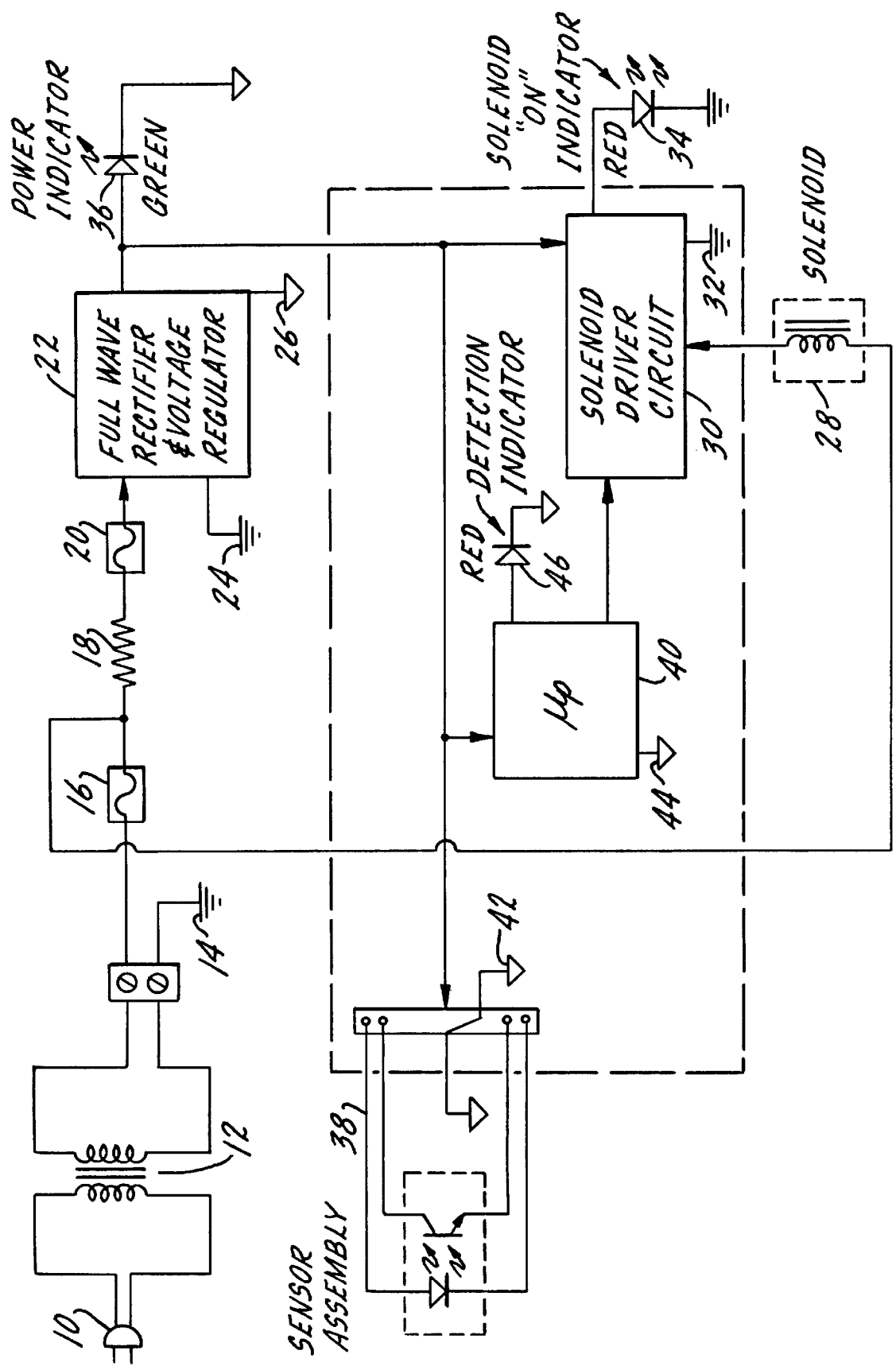

FUSE PROTECTED POWER SUPPLY CIRCUIT FOR A SENSOR-OPERATED SOLENOID

THE FIELD OF THE INVENTION

The present invention relates to sensor-operated control circuits for plumbing devices such as faucets, flush valves, hand dryers, soap dispensers or the like. More particularly, it relates to a circuit which includes automatically resettable fuses which function both to protect the circuit in the event of a shorted component and to provide a simplified expeditious method of troubleshooting such circuit. In prior circuits for use in this environment, if a component were to be shorted or otherwise malfunction, it was necessary for an electrician with diagnostic tools to determine the cause of the problem. By the addition of two automatically resettable fuses appropriately positioned within the circuit, malfunctions in the circuit can now be determined by removal and replacement of the two components which most commonly malfunction, the sensor circuit and the solenoid. The use of the described fuses permits diagnosis and repair of the circuit by a maintenance person without the need of electronic meters or the like and by a person who does not have substantial experience or training in the electronic field.

SUMMARY OF THE INVENTION

The present invention relates to power supply circuits for sensor-operated plumbing fixtures and more particularly to such a power circuit which includes two automatically resettable fuses for circuit protection and troubleshooting.

A primary purpose of the invention is to provide a power supply circuit for the described environment in which automatically resettable fuses provide a simplified and expeditious method of troubleshooting the circuit by the removal and replacement of either one or both of two components.

Another purpose of the invention is to provide automatically resettable fuses for use in a sensor-operated power supply circuit for a plumbing fixture to prevent burnout of the circuit components.

Other purposes will appear in the ensuing specification, drawing and claims.

BRIEF DESCRIPTION OF THE DRAWINGS

The invention is illustrated diagrammatically in the attached schematic diagram of a plumbing fixture sensor-operated power supply circuit.

DESCRIPTION OF THE PREFERRED EMBODIMENT

Sloan Valve Company of Franklin Park, Ill., the assignee of the present application and the assignee of U.S. Pat. No. 4,309,781, sells a number of sensor-operated plumbing fixtures under the trademark OPTIMA. Such fixtures may include flush valves for urinals and toilets, faucets, hand dryers, and soap dispensers. Each of these fixtures requires a sensor, customarily an infrared device, and a solenoid to control operation of the fixture. The power circuit for such sensor-operated fixtures has both AC and DC components and includes a rectifier. When such a circuit malfunctions, in the past it has required an electrician with substantial experience and training to troubleshoot it and find the problem. The present invention, by inclusion of two automatically resettable fuses in such a circuit, eliminates the need for a skilled electrician and permits one without such experience to find the problem in the circuit and replace the malfunctioning component with a substantial savings in maintenance cost.

In the FIGURE, the circuit power input is indicated by a plug 10 which is connected to a step-down transformer 12. One side of the output from the transformer 12 has an AC ground 14, with the power side being connected to a first automatically resettable fuse 16. The output side of fuse 16 is connected to a resistor 18, with the resistor then being connected to a second automatically resettable fuse 20. The output side of fuse 20 is connected to a full wave rectifier 22 which has an AC ground 24 and a DC ground 26.

The output side of fuse 16 is connected to a solenoid 28, the operation of which is controlled by a solenoid driver circuit 30. Circuit 30 is connected to the DC output of rectifier 22 and has an AC ground 32 and a visual indicator in the form of an LED 34 to provide an indication of when the solenoid is receiving power.

The output of rectifier 22, which is low voltage DC power, is connected to an indicator 36 which will provide a visual indication in one color, for example green, when power is being supplied to the circuit components. The output of rectifier 22 is also connected to sensor circuit 38, a microprocessor 40 and the described solenoid driver circuit. It should be understood that the diagram shown herein is not the complete sensor-operated circuit, but only the power supply connections for such a circuit.

The sensor circuit 38 has a DC ground 42; the microprocessor has a DC ground 44; and there is a detection indicator 46 which provides a visual indication of operation of the sensor circuit when detecting the presence of a person using the plumbing fixture. Preferably, the detectors 36 and 46 may be a single element which changes color, one color indicating power ON in the circuit and the other color indicating that the sensor circuit has detected the presence of a person to use the plumbing fixture. Under normal operating conditions, detector 36 will show green, indicating that power is being supplied to all the components. When a person is detected by the sensor circuit 38, detector 46 will show red. When the solenoid is being supplied with power, as controlled by the microprocessor 40 and as described in more detail in the above-mentioned U.S. patent, detector 34 will indicate that the solenoid is receiving power.

In the event that either the sensor circuit 38 or the solenoid 28 should have a short therein, the most common malfunction of these components and the most common malfunction in the control circuit, all of the indicators will be in an OFF condition. Either fuse 16 or fuse 20 will have opened the circuit, depending upon which component has malfunctioned. If the solenoid is shorted, fuse 16 will open. A person troubleshooting the circuit may first replace the sensor circuit, normally a module easily replaced, and upon doing so will notice no change in the visual indicators of the circuit. If the solenoid is replaced, the circuit will then show normal conditions on the various indicators and the malfunction has been found.

In the event that the sensor circuit is shorted, fuse 20 will open. Replacement of the solenoid will not change this condition, but replacement of the sensor circuit will. Both fuses 16 and 20 will automatically reset a few seconds after conditions are normal and functional components are in place in the circuit. Fuse 16 may have a current rating of approximately 900 milliamps and fuse 20 may have a current rating of approximately 500 milliamps.

The use of automatically resettable fuses provides protection for the circuit preventing burnout of its components in the event that the sensor or solenoid should be shorted.

Also, as described above, the automatically resettable nature of the fuses, plus the use of plug-in modules for the sensor and the solenoid permit simplified troubleshooting and replacement of the shorted components to return the circuit to a normal operating condition.

Whereas the preferred form of the invention has been shown and described herein, it should be realized that there may be many modifications, substitutions and alterations thereto.

The embodiments of the invention in which an exclusive property or privilege is claimed are defined as follows:

1. A fuse protected power supply circuit for a sensor-operated solenoid controlling a plumbing fixture, said circuit including an AC input, a first automatically resettable fuse connected on a first side to said AC input, an AC powered solenoid associated with and connected to a second side of said first automatically resettable fuse, a second automatically resettable fuse connected on a first side to the second side of said first fuse, a rectifier having a DC output connected to a second side of said second fuse, person-present sensor circuit, a microprocessor, and a solenoid driver circuit, each associated with and connected to said rectifier to receive DC power therefrom, a power ON indicator connected to said rectifier, a detection indicator connected to said microprocessor to provide a visual indication of detection by said sensor circuit, a visual indicator connected to said solenoid driver circuit to provide a visual indication when power is applied to said solenoid, a short in said solenoid causing said first automatically resettable fuse to open, a short in said sensor circuit causing said second automatically resettable fuse to open, only by removal and replacement of either said sensor circuit or said solenoid which causes its associated automatically resettable fuse to open said opened automatically resettable fuses will close permitting normal operation of said power circuit.

2. The power supply circuit of claim 1 further including a resistor connected between said first and second automatically resettable fuses.

3. The power supply circuit of claim 1 wherein said first automatically resettable fuse has a current rating of approximately twice that of said automatically resettable fuse.

4. The power supply circuit of claim 1 wherein said power indicator and detection indicator are a single element which provides one output for power ON indication and a second output to indicate sensor detection.

* * * * *